United States Patent [19]

Schwab et al.

[11] 4,356,108

[45] Oct. 26, 1982

[54] ENCAPSULATION PROCESS

[75] Inventors: Gerhart Schwab; Gerald T. Davis, both of Chillicothe, Ohio

[73] Assignee: The Mead Corporation, Dayton, Ohio

[21] Appl. No.: 105,445

[22] Filed: Dec. 20, 1979

[51] Int. Cl.³ .............................................. B01J 13/02
[52] U.S. Cl. ........................................ 252/316; 264/4; 282/27.5; 428/320.6; 428/914
[58] Field of Search ............................. 252/316; 264/4

[56] References Cited

U.S. PATENT DOCUMENTS

| | | | |
|---|---|---|---|
| 3,272,897 | 9/1966 | Herman et al. | 264/126 X |
| 3,432,327 | 3/1969 | Kan et al. | 252/316 X |
| 3,577,515 | 5/1971 | Vandegaer | 252/316 X |
| 3,607,776 | 9/1971 | Santo et al. | 252/316 |
| 3,886,085 | 5/1975 | Kiritani et al. | 252/316 |
| 4,309,213 | 1/1982 | Graber et al. | 252/316 X |

*Primary Examiner*—Richard D. Lovering
*Attorney, Agent, or Firm*—Charles N. Shane, Jr.

[57] ABSTRACT

A process for the preparation of oil-containing microcapsules by interfacial condensation of a polyfunctional amine with a polyfunctional wall-forming material is disclosed. Microcapsules produced by this process have utility in the manufacture of carbonless copy paper. The process comprises emulsifying a mixture of a hydrophobic phase, which includes an oil, a chromogenic material and an oil soluble polyfunctional wall-forming material, and a hydrophilic phase, which includes water, a water soluble emulsifying agent and a water soluble salt of the desired polyfunctional amine. The amine salt may be formed in situ in the hydrophilic phase before the emulsification step. After emulsification, sufficient base is added to the emulsion to convert the polyfunctional amine salt to a polyfunctional amine and to neutralize acid formed during subsequent condensation reactions, thus initiating the reaction of the polyfunctional amine with the oil soluble polyfunctional wall-forming material and thus forming microcapsule walls around droplets of the hydrophobic phase.

11 Claims, No Drawings

ENCAPSULATION PROCESS

BACKGROUND OF THE INVENTION

1. Field of the Invention

This invention relates to microencapsulating processes by interfacial condensation in which one of the wall-forming reactants is a water soluble polyfunctional amine. Such a process may be used for the production of microcapsules containing an oil solution of a chromogenic material for use in the manufacture of carbonless copy paper.

2. Prior Art

A process for the production of microcapsules containing oils using coacervation is disclosed in U.S. Pat. No. 2,800,457 (1957) to Green et al. The process described therein involves the coating of oil droplets with a liquid wall of gelatin gum arabic colloidal material produced by coacervation. The liquid wall thus formed is hardened by treatment with formaldehyde. It is known that aqueous solutions of hydrophilic colloids such as gelatin or gum arabic can be caused to undergo coacervation by adding to said solutions various substances such as inorganic salts or oppositely charged colloids. The coacervate droplets are known to encase droplets of water-immiscible or slightly water-immiscible liquids and to gel and solidify upon cooling to room temperatures thereby forming liquid droplets encased in a gelatin membrane. After hardening the gelatin membranes in the normal fashion (such as with formaldehyde) encapsulated suspensions of liquids are obtained which after removal of water could be transformed by known drying methods into free-flowing dry powders. Microcapsules made by the process of Green et al. have had wide commercial acceptance, primarily in the field of pressure-sensitive carbonless copy papers.

Since the advent of microcapsules produced by coacervation, microcapsules have been made using many types of wall-forming materials, wall-forming processes and wall structures. The microcapsules produced have been suggested for many uses, including the encapsulation of aromas, perfumes, flavoring agents, adhesives, reactants, color reactants, pharmaceuticals, fertilizers, pigments and opacifying agents. The nature of the material to be encapsulated and ultimate use of the microcapsules many times dictated the materials, structure and process of making them.

The production of microcapsules by means of an interfacial reaction of two reactants, one in a hydrophilic liquid and a second one in a hydrophobic liquid, is disclosed in U.S. Pat. No. 3,432,327 (1969) to Kan et al. The encapsulated liquid may be either hydrophilic or hydrophobic. The process described in this patent, as it pertains to the formation of microcapsules containing a hydrophobic liquid, involves the incorporation of one color former or color producing substance of a color producing pair in the hydrophobic liquid. Also included in this hydrophobic liquid is a wall-forming material which reacts with another wall-forming material present in a hydrophilic liquid to form a polymer film insoluble in either the hydrophilic or hydrophobic liquids. The microcapsules are formed by emulsifying the hydrophobic liquid into the hydrophilic liquid and allowing the two wall-forming materials to react at the interface of the hydrophilic and hydrophobic liquids. The resultant microcapsules are obtained as a dispersion of microcapsules in the hydrophilic liquid such as water Table 2 of the patent discloses a number of pairs of wall-forming materials including the use of polyfunctional amines with polyfunctional acyl chlorides, polyfunctional sulfonyl chlorides, polyfunctional isocyanates, bischloroformates, polyesters and epichlorohydrin. A serious disadvantage in the making of microcapsules by the process of Kan et al. is that, due to the rapid reaction of the polyfunctional amine with the second wall-forming material during the emulsification step the size and shape of the microcapsules varies over a wide range making control of the microcapsule size and size distribution difficult if not impossible. Such microcapsules would have a very limited use in the preparation of carbonless copy papers.

Attempts to overcome this disadvantage have led to process in which the droplets to be encapsulated are formed before the wall-forming reactants are brought together. U.S. Pat. No. 3,270,100 (1966) to Jolkvoski et al., U.S. Pat. No. 3,464,926 (1969) to Vandegaer et al. and British Pat. No. 950,443 (1964) disclose process of making microcapsules in which a liquid droplet containing one wall-forming reactant is injected in a liquid containing the other wall-forming reactant and the microcapsule walls are formed on contact of the two liquids. The wall-forming reactants may be polyfunctional acyl chlorides and polyfunctional amines.

U.S. Pat. No. 3,429,827 (1969) to Ruus and U.S. Pat. No. 3,577,515 (1971) to Vandegaer disclose interfacial processes wherein liquid containing one wall-forming reactant are emulsified in a continuous phase before the second wall-forming reactant is added to the continuous phase. The wall-forming reactants can be polyfunctional acyl halides and polyfunctional amines. Thus, the emulsion is established prior to the mutual contact of the two wall-forming materials.

Finally, other patents mentioning the formation of polyamide microcapsules by interfacial reaction of an amine and at least one other reactant include the following:

U.S. Pat. No. 3,492,380 (1970) to Santo et al.
U.S. Pat. No. 3,607,776 (1971) to Santo et al.
U.S. Pat. No. 3,754,062 (1973) to Kobayashi
U.S. Pat. No. 3,864,275 (1973) to Kan et al.
U.S. Pat. No. 3,886,085 (1975) to Kiritani et al.
U.S. Pat. No. 3,928,230 (1975) to Unsworth et al.
U.S. Pat. No. 3,928,685 (1975) to Alsop
U.S. Pat. No. 4,000,087 (1976) to Maalouf As can be seen from the above, there is substantial prior art concerned with the production of polyamide microcapsules by an interfacial process. In all of the prior art mentioned hereinabove, microencapsulation involves either processes whereby an amine and a wall-forming reactant therefore are incorporated in a reactable form into separate hydrophilic and hydrophobic phases and one phase is emulsified into the other phase or processes whereby one of the two reactants is not added prior to the emulsification of the two phases. In general, in the former processes, the microcapsules suffer from thermal instability and low strength properties when oily internal phase are used in a carbonless paper environment. Thus, problems can be encountered with microcapsule leakage and premature color formation. Control of the size and size distribution of such microcapsules is also difficult. In the latter processes wherein one of the reactants is not present prior to the formation of the droplet dispersion, complicated systems are required for individual droplet formation or one of the reactants must be added after formation of an emulsion of droplets thus leading to unequal distribution of one of the reactants during the initial stages of the microencapsulation (wall-forming) process.

We have found that the above disadvantages can be overcome by incorporating the amine in the hydrophilic phase in unreactable form; i.e., as the amine salt, emulsifying an oil solution containing a chromogenic material and a wall-forming material coreactive with amines into the hydrophilic phase and thus securing even distribution of the reactants in the emulsion prior to lowering the pH to initiate microencapsulation.

Microcapsules produced by the process of this invention are suitable for use in commercial production of carbonless copy papers.

STATEMENT OF THE INVENTION

A process for the preparation of oil-containing microcapsules by interfacial condensation of a polyfunctional amine with a polyfunctional wall-forming material is disclosed. Microcapsules produced by this process have utility in the manufacture of carbonless copy paper. The process comprises emulsifying a mixture of a hydrophobic phase, which includes an oil, a chromogenic material and an oil soluble polyfunctional wall-forming material, and a hydrophilic phase, which includes water, a water soluble emulsifying agent and a water soluble salt of the desired polyfunctional amine. The amine salt may be formed in situ in the hydrophilic phase before the emulsification step. After emulsification, sufficient base is added to the emulsion to convert the polyfunctional amine salt to a polyfunctional amine and to neutralize acid formed during subsequent condensation reactions, thus initiating the reaction of the polyfunctional amine with the oil soluble polyfunctional wall-forming material and thus forming microcapsule walls around droplets of the hydrophobic phase.

DETAILED DESCRIPTION OF THE INVENTION

The present invention involves the production of microcapsules by interfacial condensation of a polyfunctional amine and a wall-forming material, sometimes referred to hereinafter as a polyfunctional wall-forming material, reactable with the amine. In accordance with this invention, control of the quality, size and size distribution of the microcapsules can be substantially improved over prior art process by preventing the reaction of the two polyfunctional materials, one in a hydrophobic phase and the other in a hydrophilic phase, until emulsification of the hydrophobic phase in the hydrophilic phase is complete and the desired droplet size is established. Preventing the reaction is easily accomplished by using the polyfunctional amines in the form of their amine salts.

In general, any of the known water soluble polyfunctional amines as illustrated in Table 2 of U.S. Pat. No. 3,432,327 described supra, the subject matter of which is incorporated herein by reference, can be used in the process of this invention. Examples of the preferred polyfunctional amines include ethylene diamine, triethylene tetramine, hexamethylene diamine, diethylene triamine, tetraethylene pentamine, aminoethanolamine and mixtures thereof. The most preferred are diethylene triamine and triethylene tetramine.

In the process of this invention, the amines are used in the form of their corresponding amine salts. In the formation of the hydrophilic phase, the amine salt may be added directly to the hydrophilic phase or alternatively a polyfunctional amine may be added to the hydrophilic phase and an acid may be added to form the amine salt in situ in the hydrophilic phase.

A wide variety of oils can be used for the hydrophobic phase. The oils are immiscible with the hydrophilic phase. Preferred oils are those which have utility as carrier oils in the carbonless paper art. These include monoisopropylbiphenyl, chlorinated biphenyls, chlorinated paraffins, deodorized kerosene, alkyl phthalates, alkyl phosphates, alkyl benzoates, alkyl naphthalenes, petroleum naphtha, alkyl biphenyls, hydrogenated terphenyls and mixtures thereof.

In general, any of the oil soluble polyfunctional wall-forming materials, known to be reactable with a polyfunctional amine, as illustrated in U.S. Pat. No. 3,432,327 noted supra, can be used in the process of this invention. These include polyfunctional acyl halides, polyfunctional sulfonyl halides, polyfunctional isocyanates, bischloroformates, polyesters and epichlorohydrin and mixtures thereof. The preferred polyfunctional wall-forming materials are the polyacyl chlorides and the most preferred is terephthaloyl chloride.

In the preferred embodiment of this invention the oil contains, in solution, a chromogenic material, generally a color precursor. The color precursors most useful in the practice of this invention are of the electron donating type described generally as the phthalides, fluorans, xanthenes, indols, auramines and combinations thereof. These would include the lactone phthalides, such as crystal violet lactone, and 3,3-bis-(1'-ethyl-2'-methylindol-3'-yl) phthalide, the lactone fluorans, such as 2-N,N-dibenzylamino-6-diethylaminofluoran and 6-diethylamino-1,3-dimethylfluoran, the lactone xanthenes, the leucoauramines, the 2-(omega substituted vinylene)-3,3-disubstituted-3-H indols and 1,3,3-trialkylindolinospirans. Mixtures of these color precursors can also be used if desired. The preferred color precursor for use in the process of this invention is crystal violet lactone. The chromogenic material is generally present in the hydrophobic phase at a concentration of from about 0.1% to about 20% by weight and preferably from about 0.1% to about 10% by weight based on the combined weight of color precursor and carrier oil. Other materials can be used in the internal phase such as emulsifying agents, color intensifiers, and the like in small amounts.

A preferred embodiment of the process of this invention involves the preparation of hydrophilic and hydrophobic phases as follows:

A hydrophilic phase is conveniently prepared by dissolving the amine salt in water containing a small amount of an emulsifying agent, preferably a polyvinyl alcohol. Other known emulsifying agents; e.g., Turkey Red Oil and carboxymethyl cellulose may be used. Carboxymethylcellulose has been shown to give particularly good control of viscosity during the addition of the base after the emulsification step. The concentration of the emulsifying agent is preferably about 2% of the hydrophilic phase. The concentration of amine salt is not critical and may be from about 0.2% to about 6% of the hydrophilic phase as desired. Alternatively, the amine salt may be formed in situ in the hydrophilic phase by dissolving the desired amine in water containing an emulsifying agent and adding to this mixture, in approximately a stoichiometric amount, enouch acid to convert the amine to an amine salt. The particular acids useful in preparing amine salts include, for example, acetic acid, hydrochloric acid and sulfuric acid. The hydrophilic phase should be slightly acid and preferably in a pH range of about 1 to about 3.

A hydrophobic phase is prepared by dissolving the polyfunctional wall-forming material and desired color precursor or precursors in a carrier oil, preferably in a mixture of monoisopropylbiphenyl and deodorized kerosene. Preferably, the color precursor and polyfunctional wall-forming material are dissolved in separate portions of the carrier oil and then combined just before the emulsification step to minimize any possible reaction between the color precursor and the polyfunctional wall-forming material. Conveniently, the temperature of the color precursor solution may be raised to 90° C. to speed up solution of the precursor and insure formation of a clear solution. The concentration of the polyfunctional wall-forming material in the hydrophobic is not critical. However, the polyfunctional wall-forming material should be present in amount sufficient to react with the polyfunctional amine and form microcapsule walls which are sufficiently cross-linked to make them impermeable to both the hydrophobic and hydrophilic phases.

The hydrophobic phase and hydrophilic phase are vigorously mixed to form an emulsion of small droplets of the hydrophobic phase in the hydrophilic phase. Mixing can be by stirring, shaking or milling. The droplet size may be from about 1 micron to about 20 microns, preferably from about 3 to 10 microns. After the desired droplet size is reached, sufficient inorganic base in aqueous solution is stirred into the emulsion to convert the amine salt to an amine and to neutralize any acid formed in the subsequent condensation reaction. Any water soluble alkali or alkaline earth hydroxide may be used, however sodium hydroxide is preferred. The pH of the emulsion at this point should be slightly alkaline with the preferred pH range being about 9 to about 11. The emulsion is stirred for a period of 1 to 16 hours, preferably 2 to 6 hours, during which time the microcapsule walls are formed by interfacial condensation of the polyfunctional amine and the polyfunctional wall-forming material. The walls are impermeable to both hydrophilic and hydrophobic phases. The microcapsules formed may be separated from the hydrophilic phase by filtering, centrifuging, spray drying or other known means of microcapsule separation or the dispersion of microcapsules may be applied as a coating composition directly to a substrate such as paper or plastic film.

Generally, it has been noted that a slight amount of color develops in the emulsion during the emulsification step due apparently to some premature color formation of the color precursor in the acid hydrophilic phase. This color has been found to gradually disappear on addition of the inorganic base and, by the time the microcapsules are fully formed, the emulsion is white. This temporary color formation did not appear to affect the functionality of the microcapsules in the carbonless copy environment.

In a preferred embodiment of the invention, the microcapsules contain an oil solution of a color precursor. To such microcapsules may be added a binder, such as a hot melt composition or aqueous dispersion of a starch or synthetic latex, and a stilt material, such as starch particles, and the resultant coating composition may be applied by coating or printing to a paper or paper-like substrate. The coated substrate may be used as a transfer sheet in carbonless manifold forms.

The preferred embodiments are described in greater detail herein below by reference to the following examples. These examples are for illustrations only and are not intended to be limitations on the process of this invention. Unless otherwise noted the parts, percents and the like are by weight.

EXAMPLE 1

Solution A
  Monoisopropylbiphenyl (MIPB): 48 parts
  Crystal Violet Lactone: 3 parts
  Deodorized Kerosene: 12 parts
Solution B
  Monoisopropylbiphenyl: 24 parts
  Terephthaloyl Chloride: 10.1 parts
  Deodorized Kerosene: 6 parts
Solution C (pH=6.5)
  Polyvinyl alcohol (5% sol. in $H_2O$): 70 parts
  Water: 83.3 parts
  Triethylene tetramine: 6 parts
  Hydrochloric Acid (38% sol. in $H_2O$): 10.2 parts
Solution D
  Water: 60 parts
  Sodium Hydroxide: 8.15 parts
  Turkey Red Oil: 0.31 parts Each solution was prepared by mixing together the above indicated ingredients and continued mixing until the ingredients were dissolved. In order to facilitate solution of the crystal violet lactone, Solution A was heated to about 95° C. Solution B was warmed slightly.

Solutions A and B were combined and put in a Waring Blender with Solution C. The blender was turned on at its highest setting and the mixture was emulsified for two minutes. At this point, the emulsion turned slightly blue. Solution D was then added, and the blue emulsion was transferred to a glass beaker and subjected to slow mixing with a propeller type blade. After ten minutes of slow stirring, the emulsion turned white. Slow agitation was continued for about 16 hours (overnight). The pH at the end of this period was 9.0.

Microcapsules produced as above were analyzed for particle size on the Coulter Counter, Model TA II. The mean particles size was 3.6 microns. 50% of the particles were between 2.1 microns and 4.8 microns and 98% of the particles were between 0.8 microns and 13.0 microns.

The microcapsules were incorporated into an aqueous coating composition at about 20% solids having the following formula:
  Microcapsules: 52.4 parts
  Starch binder: 29.4 parts
  Wheat starch particles: 18.2 parts Drawdowns of the coating composition on a carbonless paper base-stock were made applying about 2 pounds of dried solids per 3300 square feet of paper. The paper was used as the transfer (CB) sheet in a manifold set in which the record (CF) sheet was coated with a solvent applied novolak resin coating. Pressure imaging produced a blue mark.

EXAMPLE 2

Solution A
  Dibutyl phthalate: 36 parts
  Crystal Violet Lactone: 3 parts
  Deodorized Kerosene: 24 parts
Solution B
  Dibutyl phthalate: 18 parts Terephthaloyl Chloride: 10.1 parts
Deodorized Kerosene: 12 parts
Solution C (pH=1.3)
Carboxymethylcellulose (5% sol. in $H_2O$): 43.9 parts
Water: 109.9 parts
Triethylene tetramine: 6 parts
Hydrochloric Acid (38% sol. in $H_2O$): 15.7 parts
Solution D
Water: 60 parts
Sodium Hydroxide: 10.7 parts Microcapsules were prepared using the above solutions in the procedure of Example 1. Slight bluing of the emulsion occurred during the emulsification step and the emulsion turned white after the addition of Solution D. The pH of the emulsion was 10.2 at 30 minutes after Solution D was added.

Microcapsules produced as above were analyzed for particle size on the Coulter Counter, Model TA II. The mean particle size was 6.2 microns. 50% of the particles were between 4.4 microns and 8.9 microns and 98% of the particles were between 1.6 microns and 20.5 microns.

Paper coated as in Example 1 and pressure imaged against a novolak coated paper gave a blue image.

EXAMPLE 3

Solution A
Monoisopropylbiphenyl: 48 parts
Crystal Violet Lactone: 3 parts
Deodorized Kerosene: 12 parts
Solution B
Monoisopropylbiphenyl: 24 parts
Terephthaloyl Chloride: 10.1 parts
Deodorized Kerosene: 6 parts
Solution C
Polyvinyl alcohol (5% sol. in $H_2O$): 43.9 parts
Water: 109.9 parts
Triethylene tetramine: 6 parts
Hydrochloric Acid (38% sol. in $H_2O$): 15.7 parts
Solution D
Water: 60 parts
Sodium Hydroxide: 10.7 parts Microcapsules were prepared using the above solutions in the procedure of Example 1. Slight bluing of the emulsion occurred during the emulsification step and the emulsion turned white after the addition of Solution D.

Microcapsules produced as above were analyzed for particle size on the Coulter Counter, Model TA II. The mean particle size was 5.6 microns. 50% of the particles were between 3.8 microns and 8.0 microns and 98% of the particles were between 1.5 microns and 16 microns.

Paper coated as in Example 1 and pressure imaged against a novolak coated paper gave a blue image.

EXAMPLE 4

Solution A
Monoisopropylbiphenyl: 48 parts
Crystal Violet Lactone: 3 parts
Deodorized Kerosene: 24 parts
Solution B
Monoisopropylbiphenyl: 18 parts
Terephthaloyl Chloride: 10.1 parts
Deodorized Kerosene: 12 parts
Solution C (pH=6.8)
Polyvinyl alcohol (5% sol. in $H_2O$): 70 parts
Water: 83.3 parts
Triethylene tetramine: 3.63 parts
Hexamethylenediamine: 2.80 parts
Hydrochloric Acid (38% sol. in $H_2O$): 10.75 parts
Tamol 731 (25% aqueous solution): 5.0 parts
Solution D
Water: 60 parts
Sodium Hydroxide: 10.7 parts Microcapsules were prepared using the above solutions in the procedure of Example 1. Slight bluing of the emulsion occurred during the emulsification step. The pH of the emulsion was 10.3 at 30 minutes after Solution D was added. The emulsion was white after standing overnight.

Paper coated as in Example 1 and pressure imaged against a novolak coated paper gave a blue image.

EXAMPLE 5

Solution A
Dibutyl phthalate: 60 parts
Paratoluene Sulphonate Michler's Hydrol: 3 parts
Solution B
Dibutyl phthalate: 30 parts
Terephthaloyl Chloride: 10.1 parts
Solution C
Polyvinyl alcohol: 120 parts
Water: 278 parts
Triethylene tetramine: 5.9 parts
Hydrochloric Acid (38% sol. in $H_2O$): 15.9 parts
Solution D
Water: 60 parts
Sodium Hydroxide: 10.6 parts Each solution was prepared by mixing together the above indicated ingredients and continued mixing until the ingredients were dissolved. In order to facilitate solution of the crystal violet lactone, Solution A was heated to about 80° C.

Solutions A and B were combined and mixed together vigorously for two minutes with Solution C. At this point, the emulsion turned slightly greenish. Solution D was then added, and the greenish emulsion was subjected to slow mixing with a propeller type blade. After about fifteen minutes of slow stirring, the emulsion turned white. Slow agitation was continued for about 16 hours (overnight).

Microcapsules produced as above were analyzed for particle size on the Coulter Counter, Model TA II. The mean particle size was 6.35 microns. 50% of the particles were between 4.65 microns and 9 microns and 98% of the particles were between 2 microns and 20 microns.

What is claimed is:

1. A process for the preparation of oil-containing microcapsules by interfacial condensation of wall-forming materials, said microcapsules having utility in the manufacture of carbonless copy paper, comprising steps of:
  (a) forming a hydrophilic phase comprising water, a water soluble emulsifying agent and a water soluble polyfunctional amine salt, said polyfunctional amine salt being the reaction product of a polyfunctional amine and an acid;
  (b) forming a hydrophobic phase comprising an oil and an oil soluble polyfunctional wall-forming material, said oil containing a chromogenic material;

(c) mixing together said hydrophobic and said hydrophilic phases with agitation, thus forming an emulsion of droplets of said hydrophobic phase in said hydrophilic phase, said droplets being from 3 to 10 microns in diameter;

(d) adding an inorganic base to said emulsion, said inorganic base being addd in an amount sufficient to convert said polyfunctional amine salt to a polyfunctional amine, and to neutralize acids formed during subsequent condensation reactions, said polyfunctional amine being coreactive with said oil soluble polyfunctional wall-forming material, the pH of said resulting emulsion being slightly alkaline;

(e) stirring the resulting emulsion for a period of time sufficient to allow said polyfunctional amine and said oil soluble polyfunctional wall-forming material to react to form microcapsule walls around said droplets of hydrophobic phase, said microcapsule walls being substantially impermeable to said hydrophilic and said hydrophobic phases.

2. The process of claim 1 wherein said chromogenic material is a color precursor of the electron donating type.

3. The process of claim 1 wherein said polyfunctional amine salt is produced in situ in said hydrophilic phase by separately adding to said hydrophilic phase a polyfunctional amine and an acid.

4. The process of claim 3 wherein said polyfunctional amine is selected from the group consisting of diethylene triamine, triethylene tetramine and mixtures thereof.

5. The process of claim 3 wherein said acid is selected from the group consisting of acetic acid, hydrochloric acid and sulfuric acid.

6. The process of claim 1 wherein said oil soluble polyfunctional wall-forming material is a polyacyl chloride.

7. The process of claim 6 wherein said polyacyl chloride is terephthaloyl chloride.

8. The process of claim 1 wherein said emulsifying agent is selected from the group consisting of polyvinyl alcohol and carboxymethylcellulose.

9. A process for the preparation of oil-containing microcapsules by interfacial condensation of wall-forming materials, said microcapsules having utility in the manufacture of carbonless copy paper, comprising the steps of:

(a) forming a hydrophilic phase comprising water, a water soluble emulsifying agent selected from the group consisting of polyvinyl alcohol and carboxymethylcellulose, a water soluble polyfunctional amine, and sufficient acid to convert said polyfunctional amine to a polyfunctional amine salt, said polyfunctional amine being selected from the group consisting of diethylene triamine, triethylene tetramine and mixtures thereof;

(b) forming a hydrophobic phase comprising an oil and an oil soluble polyacyl chloride, said oil containing a chromogenic material, said chromogenic material being a color precursor of the electron donating type;

(c) mixing together said hydrophobic and said hydrophilic phases with agitation, thus forming an emulsion of droplets of said hydrophobic phase in said hydrophilic phase, said droplets being from 3 to 10 microns in diameter;

(d) adding an inorganic base to said emulsion, said inorganic base being added in an amount sufficient to convert said polyfunctional amine salt to a polyfunctional amine, and to neutralize acids formed during subsequent condensation reactions, said polyfunctional amine being coreactive with said oil soluble polyacyl chloride, the pH of the resulting emulsion being slightly alkaline;

(e) stirring said resulting emulsion for a period of time sufficient to allow said polyfunctional amine and said oil soluble polyacyl chloride to react to form microcapsule walls around said droplets of said hydrophobic phase, said microcapsule walls being substantially impermeable to said hydrophilic and said hydrophobic phases.

10. The process of claim 9 wherein said polyfunctional amine includes diethylene triamine.

11. The process of claim 9 wherein said polyacyl chloride is terephthaloyl chloride.

* * * * *